United States Patent
Houmani et al.

(10) Patent No.: US 11,989,979 B2
(45) Date of Patent: May 21, 2024

(54) METHOD FOR GENERATING INFORMATION ABOUT THE PRODUCTION OF A HANDWRITTEN, HANDAFFIXED OR PRINTED TRACE

(71) Applicant: INSTITUT MINES TELECOM, Palaiseau (FR)

(72) Inventors: Nesma Houmani, Melun (FR); Sonia Garcia-Salicetti, Paris (FR)

(73) Assignee: INSTITUT MINES TELECOM, Palaiseau (FR)

( * ) Notice: Subject to any disclaimer, the term of this patent is extended or adjusted under 35 U.S.C. 154(b) by 81 days.

(21) Appl. No.: 17/422,198

(22) PCT Filed: Jan. 11, 2019

(86) PCT No.: PCT/IB2019/050224
§ 371 (c)(1),
(2) Date: Jul. 11, 2021

(87) PCT Pub. No.: WO2020/144494
PCT Pub. Date: Jul. 16, 2020

(65) Prior Publication Data
US 2022/0075987 A1  Mar. 10, 2022

(51) Int. Cl.
*G06K 9/00* (2022.01)
*G06V 30/226* (2022.01)
*G06V 30/228* (2022.01)
*G06V 40/30* (2022.01)

(52) U.S. Cl.
CPC ............ *G06V 40/33* (2022.01); *G06V 30/226* (2022.01); *G06V 30/228* (2022.01)

(58) Field of Classification Search
CPC ..... G06V 40/33; G06V 30/226; G06V 30/228
See application file for complete search history.

(56) References Cited

U.S. PATENT DOCUMENTS

| 7,068,829 B1 | 6/2006 | Love |
| 7,580,551 B1 | 8/2009 | Srihari et al. |

(Continued)

FOREIGN PATENT DOCUMENTS

| CN | 103198324 A | 7/2013 |
| TW | 201544991 A | 12/2015 |

OTHER PUBLICATIONS

International Search Report corresponding to International Application No. PCT/IB2019/050224 dated Sep. 12, 2019, 4 pages.

(Continued)

*Primary Examiner* — Gregory M Desire
(74) *Attorney, Agent, or Firm* — Ronald M. Kachmarik; Cooper Legal Group LLC

(57) ABSTRACT

A method for generating at least one information about the production of a handwritten, hand-affixed or printed trace on a surface. The method includes extracting several features describing the trace from at least one three-dimensional image of the trace, acquired by an imagery system. The method includes inputting the extracted features in a trained module to output the at least one information. The module has been trained beforehand with a plurality of previously-acquired three-dimensional images of traces and corresponding information related to the production of these traces.

20 Claims, 2 Drawing Sheets

(a)                                                                (b)

(56) References Cited

U.S. PATENT DOCUMENTS

| | | | | |
|---|---|---|---|---|
| 7,630,551 B2* | 12/2009 | Koubaroulis | ........ | G06V 30/333 |
| | | | | 382/179 |
| 8,907,932 B2* | 12/2014 | Rusu | ...................... | G06V 40/30 |
| | | | | 345/158 |
| 9,665,768 B2* | 5/2017 | Marcelli | ............. | G06V 30/1914 |
| 10,242,276 B2* | 3/2019 | Elarian | ............. | G06V 30/2276 |
| 2003/0142065 A1 | 7/2003 | Pahlavan | | |

OTHER PUBLICATIONS

Tobias Scheidat, et al., "Biometric authentication based on 2D/3D sensing of forensic handwriting traces", IET Biometrics, IEEE, Michael Faraday House, Six Hills Way, Stevenage, Herts. SG1 2AY, UK, vol. 6, No. 4, Jun. 29, 2017, pp. 316-324, XP006062005.

G.S. Spagnolo, et al., "Potentiality of 3D laser profilometry to determine the sequence of homogenous crossing lines on questioned documents", Forensic Science International, Elsevier B.V., Amsterdam, NL, vol. 164, No. 2-3, Dec. 20, 2006, pp. 102-109, XP027940107.

G.S. Spagnolo, et al., "Determination of the sequence of line crossings by means of 3D laser profilometry", Proc. SPIE 5954, Optical Security Systems, 59540V, 2005.

\* cited by examiner (a)            (b)

(a)            (b)

METHOD FOR GENERATING INFORMATION ABOUT THE PRODUCTION OF A HANDWRITTEN, HANDAFFIXED OR PRINTED TRACE

TECHNICAL FIELD

The present invention relates to a method and system for generating information about the production of a handwritten, hand-affixed or printed trace on a surface.

BACKGROUND ART

The analysis and recognition of handwritten or printed traces is usually made on documents digitized by two-dimensional (2D) scanners, or directly on paper, subjectively by human experts, as forensic experts, graphologists, paleographers, epigraphists, via different techniques, using for example magnification tools as magnifying glasses or microscopes, photographic techniques, using for example ultraviolet or infrared light, or an electrostatic detection apparatus (ESDA). These analyses find their applications, among others, in the automatic analysis of digitized documents, for example for the recognition of the structure or content of the document, in biometrics, especially for identification and/or verification of the writer, or the detection of imitations, or in forensic sciences.

The analysis can be made by human experts, as described above, or by performing an automatic 2D analysis. In such automatic analyses made on 2D scanned data, the captured images are static; the dynamic of production of the trace is thus lost, which limits the recovery of the intrinsic information forming the ecosystem of the trace, referring at least to the used support and tool, the used materials, the trace genesis, the production scenario. The content of available information is thus restricted.

Such analyses are costly in time and human effort. Moreover, the results can be very compromised by the quality of the data, due to the quality of the sensors, and to the fact that the data could be altered by time and by human manipulation. This is often the case when the trace is brief and carries little visible information, as in the case of a signature or of an indented mark. For example, an ESDA does not always recover indented marks, even those visible to the naked eye. These indented impressions correspond to impressions left on a notepad by a text written on the sheet above, and are due to the pressure of the instrument used to write on the sheet.

Also, the amount of information available is not entirely perceptible. For these reasons, in some applications such as forensics, it is not possible to obtain reliable conclusions.

In the particular case of writing, the experts also exploit the graphometry, a technique that analyzes different attributes of the plot, such as dimension, length, direction, support, thickness, homogeneity, tension, quakes, spacings, etc., with different scales of notation, and then apply statistical methods on the measurements.

These known techniques, although quite mature, suffer from certain limitations. In forensic science, manual analysis relies on nearly three hundreds checkpoints to authenticate writings, identify the writer(s) or exclude an individual as a suspect. The analysis can be very tedious and time-consuming, while some cases require quick conclusions. It is often necessary to combine several techniques for a complete and finer analysis. The certainty of the conclusion is related to the quality, quantity and contemporaneity of the analyzed traces, and these conclusions depend on the experience of the expert, which can be sensitive to the circumstances, as emotion, stress, or fatigue. Besides, the experts work on the original copy of the trace, which requires several manipulations of the copy, sometimes at several different times, which alters its quality.

Some works are devoted to the capture of writing through the analysis of gestures, either via an accelerometer, as in the patent application US 2003/0142065, sometimes combined with a system for recognizing the writing, as in the patent application CN 103198324, either via a depth sensor when the person makes the gesture of writing in the air on the basis of a model, as in the patent application TW 201544991. These methods do not take interest in the trace and its ecosystem, but only in the gesture produced by the hand and its kinematics through accelerometers or depth sensors.

It is known to use three-dimensional (3D) laser sensors for forensic analysis applications in forensic science. In the articles of G. S. Spagnolo et al., "*Determination of the sequence of line crossings by means of 3D laser profilometry*", Proc. SPIE 5954, Optical Security Systems, 59540V, 2005), and of G. S. Spagnolo, "*Potentiality of 3D laser profilometry to determine the sequence of homogenous crossing lines on questioned documents*", Forensic Science International, 2006, 164(2-3):102-109, the authors note that it is possible to recover the order of strokes of a handwriting trace through 3D sensor technology.

The article of T. Scheidat et al "*Biometric authentication based on 2D/3D sensing of forensic handwriting traces*", IET biometrics 2017, vol. 6 iss 4, pages 316-324, describes a method for forensic handwritten traces analysis by using a chromatic white light (CWL) sensor and a Hamming distance measurement to compare the trace under test to reference traces.

PROBLEM TO BE SOLVED

There exists a need to further improve the methods of analysis and recognition of handwritten or printed traces, in order to have a quick, reliable and automatic response providing information about the production of the trace.

DISCLOSURE OF THE INVENTION

The invention aims at least to achieve this goal by virtue of a method for generating at least one information about the production of a handwritten, hand-affixed or printed trace on a surface, comprising:
  extracting several features describing the trace from at least one three-dimensional image of said trace, acquired by an imagery system, and
  inputting said extracted features in a trained module to output said at least one information, said module having been trained beforehand with a plurality of previously-acquired three-dimensional images of traces and corresponding information related to the production of these traces.

By "trace", it has to be understood a physical, material mark left by the action and the passage of the finger or an object, as a pen, a printer, a paintbrush, on a flexible or rigid support. The trace may be visible to the naked eye or not. It may be handwritten or printed, being for example a writing, as sentences, words, letters, a signature, a drawing, scribbles, tags, graffiti, engraving, or graphics.

Such a trace often reflects an earlier action, intentional or not, and may reveal a past context. It may remain in time, but may be altered or even erased.

The trace may be printed or written on various and varied supports, such as paper, parchment, stone, wall, canvas, fabric, a car, etc.

The methods according to the invention allows analyzing in three-dimension and at high resolution traces and fingerprints related to fine hand movements or printed, as well as traces invisible to the naked eye, as indented marks, to recover their dynamic and spatio-temporal features by artificial intelligence techniques. Through this enrichment of information, the invention leads to an "augmented trace" that allows to go back to the origin and context of its production, that is to say "who, what, how, when, where", and thus to conclude, for example, on its authenticity and on the identity of its producer.

The invention makes it possible to automatically recover hidden intrinsic information already existing in the trace, and to obtain an enriched or "augmented" trace, by enriching its content and rebuilding the ecosystem of the trace. It offers an automated analysis providing decision support to human experts. This induces a saving of time, less human effort, and better reliability because the analysis is independent from the human expert.

The invention uses image processing techniques, statistical methods, and deep learning methods on the acquired images to go up automatically to the kinematic information of the trace, that is to say mostly the speed and acceleration of the writing, the strokes order, the pressure and the tremors applied on the surface.

The features extracted for the analysis of the trace and its ecosystem depend heavily on the desired application. The method according to the invention allows the configuration of the analysis and its adaptation to different applications.

The invention targets applications where handwritten or printed traces, visible or not, need to be analyzed, especially:
forensic science: identification of the writer and determination of the number of writers, for example for anonymous mails, signatures, or reconstruction of the scenario related to the production of traces or fingerprints made by hand, or analysis of crime scenes, for example analysis of traces handwritten or affixed on a wall, for example by using any tool, or of traces affixed on a car, as scratches or shocks,
biometrics: identification and/or verification of the identity of the writer, detection of imitations of signatures,
soft biometrics: inference on the writing of age, sex, laterality, state of health, pathologies, emotions, psychological state,
legal expertise: expertise of documents with legal value, for example during the trial of a case by a judge,
health: characterization of pathologies, rehabilitation,
authentication of art works: signature, autographs, identification of the process followed during the production of the work, analysis of the support and of materials used,
analysis of ancient inscriptions (paleography, epigraphy), ancient documents (manuscripts, musical scores) and autographs,
graphology: for establishing the psychological profile of the writer, identification of the process followed during the writing of the document.

The exploitation of the third dimension allows restoring information on the pressure applied on the surface, the sequences of actions while writing, and the kinematic of the trace. These elements make it possible in forensic science to identify the writer much more efficiently.

The three-dimensional image of the trace is advantageously stored along with said extracted features to create an augmented trace, being preferably further stored in a database.

Therefore, the invention further allows opening new horizons for the conservation of traces, especially in forensic science. Today, because it is assumed that the human expert is the only one able to go back to the information, the original traces are kept under seal, without protection of some elements that fade over time, as pencil, ink, stamping, or other fingerprints. The storing of documents in the form of 3D scans makes perfect sense as it faithfully keeps all available information, visible or not. It also makes it possible to put the trace at the disposal of several experts at the same time, even at different locations.

Features Describing the Trace

Local and semi-global features may be extracted.

The features may be extracted pointwise or at the level of portions or segments in the trace. The features may be extracted internally by deep learning models.

The extracted features may be chosen amongst the following: the order of strokes, the number of strokes, the relief of the trace, the pressure exerted along the trace, the order of letter writing, the letter spacing, grey-levels of voxels, the position of pixels forming the trace, the width of the trace, or gradient-based features, slope-based features, features based on internal and external contours, topographic features based on texture analysis, fractal measures, Fourier components, discrete cosine or Wavelet transforms, this list being non-exhaustive.

The order of letter writing is induced by the way of writing of a person, for example a person may write the letter "O" clockwise motion, while another one may writer it in a counter-clockwise. Gradient-based features and slope-based features advantageously indicate slants or slopes of handwriting.

Such features allow obtaining information especially on the pressure applied on the surface to produce the trace, the gesture dynamics, notably the production sequence, line crossing, line speed, or braking zones, or handwriting variations in the document, by measuring the intra-class variability along a text to characterize the potential writer or writers.

In the case where the trace belongs to a full text or document, the analysis according to the invention allows obtaining the reconstruction of the process followed during the production of the document, especially the production sequencing, if, for example, the trace has been deposited in advance of the text, if the trace is not of the same nature as the text as in the case of a photocopied or scanned signature at very good resolution, possibly different natures of the used inks, the nature of used materials, as a laser printer or ballpoint pen, unique or different style of writing in the same document, apposition of these styles at different times or not.

Feature Extraction

In order to generate said at least one information about the production of the trace, at least a weighted combination of said extracted features describing the trace is inputted in the trained module, each feature being weighted by a weight computed based at least on the type of trace, especially a trace handwritten on paper, an indented mark or a printed trace.

In the case of a trace handwritten on paper, features describing the order and the number of strokes, the letter spacing, and grey-levels of voxels, may be weighted by higher weights than features describing the relief of the trace or the pressure exerted along the trace.

In the case of an indented mark, features describing the relief of the trace or the pressure exerted along the trace may be weighted by higher weights than features describing the order and the number of strokes, the letter spacing, and grey-levels of voxels.

The weights may be learned automatically by the used learning model.

Information about the surface or contained in it may be combined with said extracted feature describing the trace to generate said at least one information, for example the nature of the surface, its topography, especially its texture, rough or smooth, its homogeneity, or its sharpness, its morphology, especially the thickness and depth distribution of the surface, a factor indicating if the surface has been handled several times or not, or has undergone treatments, as cleaning, or not.

At least two different resolutions of said at least one three-dimensional image may be used to extract features describing the trace, said features being then combined to generate said at least one information.

The invention thus makes it possible to use both low and high levels of information, by combining different sources of information, especially contained in the trace and in the surface, and by combining different features computed by different models. The merging or fusion of different parameters of analysis models, of scores, and of decisions coming from different models may also be performed.

The features may be extracted thanks to operations chosen amongst the following: segmentation, edge detection, morphological operations, such as erosion, dilatation, closing or opening, frequency analysis, such as Fourier transform, wavelet transform, Gabor filters.

The combinations of features and/or information about the surface or contained in it may be performed by methods chosen amongst: weighted sum, model-based merging methods, clustering ensembles, Dempster-Shafer method, particle swarm optimization, or Gaussian mixture models, this list being non-exhaustive.

At least two different operations may be used in order to extract at least two different features describing the trace.

At least one preprocessing operation may be performed on said images, as a smoothing operation, an enhancing operation, or a filtering operation. Such a preprocessing allows enhancing the quality of the images, and thus facilitates the extraction of the features, increasing the reliability of the invention.

Trained Module and Information About the Production of the Trace

By "trained module", it has to be understood a model with associated learning and training algorithms that analyze data, used for classification or regression analysis, or for modeling or characterizing information.

A further object of the invention is a method for training a module to learn features, using a plurality of previously-acquired three-dimensional images of traces handwritten, hand-affixed or printed on a surface, method in which:

several features describing each trace are extracted from said previously-acquired images, and
the module is trained to learn said extracted features.

The trained module may comprise one or several neural networks, and/or one or several decision trees, for example a classification and regression tree (CART), and/or one or different classifiers, as for example support vector machines (SVM).

Classification and regression trees create mutually exclusive classes by answering questions in a predefined order, while SVM is a supervised method allowing building models by integrating a high number of variables that cannot be separated linearly. In this approach, similarity kernels are used for data transformation and for choosing data points or support vectors.

The trained module may use models chosen amongst the following: hidden Markov models, Gaussian mixture models, fuzzy methods, Bayesian networks, hidden control or Markov random fields, K-nearest neighbor method, clustering techniques, ensemble methods, bootstrap aggregating or bagging techniques, kernel principal component analysis (PCA), independent component analysis, linear discriminant analysis, kernel-discriminant analysis, linear and non-linear regression models, or genetic algorithms, this list being non-exhaustive.

One of several parameters may be chosen for the trained module, for example the number of layers of neural networks, the number of states of Hidden Markov Models, the number of component densities for statistical models, the type of kernel functions in Support Vector Machines, or the number of classes in unsupervised clustering techniques.

The information about the production of the trace may be in the form of a score.

The score may be in the form of a probability.

The score may be in the form of a numerical value, for example evaluating the authenticity of the trace, when the identity of the writer is pretended beforehand, for example a value comprised between 0 and 10, the higher is the value, and the higher is the chance of having an authentic trace.

In a variant, the score is in the form of a letter, especially showing that a trace is thought to belong to a group of traces having the same features, for example group A, group B, group C, and so on.

Such a score is a measure of the quality of the trace in terms of its intrinsic information content.

Based on the generated score(s), the trace may be assigned to a class, for example "authentic", "forged", "disguised" or "indefinite", "same writer" or "different writers", "handwritten trace" or "printed trace".

The trained module may have also been trained beforehand to learn features describing traces and extracted from said plurality of previously-acquired three-dimensional images of traces.

Said information about the production of the trace is advantageously used during the learning step of the trained module, in order that the latter can learn to associate the correlated features with such information.

The information about the production of the trace may be, but is not limited to:

the authenticity of the trace;
whether the trace is handwritten or not;
if the trace was made by one or more writers, and possibly the number of writers;
the identity of the writer(s) and its verification, in the case where a list of possible identities is provided by a forensic expert, with an associated confidence score;
the possibility that two or more traces were produced in the same way, for example by the same person, information used in the re-identification of people, or by the same ink;
the detection of signature imitations or disguised signatures, or of autographs with 'forged' signatures,
the type of forgery;
the age category of the writer(s) having produced the trace, if the latter is handwritten;
the laterality of the producer of the trace, and its inference;
the detection of erasures not visible to human eyes;

the identification of fingerprints on a document;

the object or material used for the production of the trace, such as laser printer or ballpoint pen;

the identification of the printing process used to prepare documents, such as typewriter, printed with ink jet, laser printers, and photocopiers;

the identification of writing that has been added with a different ink;

the nature of the surface, especially rigid or flexible;

the production of evidence of the continuity or non-continuity of entries made in a document, such as a journal or a patient medical record; and the psychological state of the writer, useful for example in some applications where the profiling of a person's mental health is required.

More specifically, in the case of a trace handwritten on paper, the information about the production of the trace may be the verification of identity, the detection of signature imitations or disguised signatures, or of autographs with 'forged' signatures, for example for art works, or sport items, the nature of the used material for handwriting, the inference of laterality of the writer.

In the case of an indented mark, the information about the production of the trace may be the inference of laterality of the writer, the detection of erasures not visible to human eyes, the identification of fingerprints, the production of evidence of the continuity or non-continuity of entries made in a document, such as a journal or a patient medical record.

In the case of a printed trace, the information about the production of the trace may be the identification of the printing process used to prepare documents, such as typewriter, printed with ink jet, laser printers, and photocopiers.

Said information about the production of the trace may be transmitted to a user by any suitable mean, for example by being displayed on a screen of an electronic system, printed, or by vocal synthesis.

Said information may be used as entry value in another program, and/or may be combined to other information, for example information concerning the writer of the trace.

3D Images and Resolution

The three dimensional images of the traces may be acquired by any imagery system that allows recovering a 3D image at least one or different resolutions.

The three-dimensional images of the traces may be acquired by a 3D scanner, a 3D laser scanning microscope, a 3D optical sensor based on Optical Coherence Tomography, a chromatic white-light sensor, a confocal laser scanning microscope, a scanning electron microscope, a 3D laser profilometer, or a sensor based on conoscopic holography, this list being non exhaustive.

The three dimensional images of the traces may be acquired by any imagery system that allows recovering a 3D image at least one or different resolutions.

As previously stated, at least two different resolutions of said at least one three-dimensional image may be used to extract features describing the trace, especially at low and high resolution.

New 3D sensors indeed make it possible to perform image acquisitions by configuring the spatial resolution. The possibility allows applying multi-scale analysis methods. Indeed, a fine description makes it possible to get as close as possible to the dynamics of the gesture used to write or affix the trace. A coarser description of the trace is also very relevant, allowing for example not to accentuate the differences related to the intra-class variability of the writer, for example between two authentic signatures of the same person.

The exploitation of different resolutions combined with artificial intelligence methods and merging features and information makes it possible to have access to a history not only of the trace, but also of the surface and its uses over time, thus bringing a lot of complementary information leading to a scenario about the production of traces. This is particularly useful in forensic science, or in expertise of art works or legal documents.

Method of Identification and/or Authentication

A further object of the invention is a method for identifying and/or authenticating a trace handwritten on a surface, comprising:

extracting several features describing the trace from at least one three-dimensional image of said trace, acquired by an imagery system, and inputting said extracted features in a trained module to output at least one information about the identification and/or the authentication of said trace, said module having been trained beforehand with a plurality of previously-acquired three-dimensional images of traces and corresponding information related to the identification and/or the authentication of these traces.

The features defined above for the method of generation of information apply to the method of identification and/or authentication.

System

A further object of the invention is a system for generating at least one information about the production of a handwritten, hand-affixed or printed trace on a surface, comprising a trained module, the system being configured to:

extract several features describing the trace from at least one three-dimensional image of said trace, acquired by an imagery system, and input said extracted features in the trained module to output said at least one information, said module having been trained beforehand with a plurality of previously-acquired three-dimensional images of traces and corresponding information related to the production of these traces.

The system according to the invention advantageously extracts automatically the hidden intrinsic information already existing in the trace.

The system preferably comprises a preprocessing module configured to perform preprocessing operations on said images, as a smoothing, enhancing, or filtering.

The trained module may comprise one or several neural networks, and/or one or several decision trees, and/or one or different classifiers.

The system may comprise the imagery system used for acquiring said at least one three-dimensional image of the trace, at one or several resolutions. The imagery system may be a 3D scanner, a 3D laser scanning microscope, a 3D optical sensor based on Optical Coherence Tomography, a chromatic white-light sensor, a confocal laser scanning microscope, a scanning electron microscope, a 3D laser profilometer, or a sensor based on conoscopic holography, this list being non exhaustive.

The system may comprise a user interface, which may allow the user to choose the preprocessing operation(s) to be performed, the feature(s) to be extracted and the operation(s) used to do so, the parameter(s) of the trained module, and/or the information to be used.

The system is advantageously an electronic system, preferably comprising at least a microcontroller and a memory, being in particular a personal computer or a calculation server.

The features defined above for the methods apply to the system.

Computer Program Product

Yet a further object of the invention is a computer program product for generating at least one information about the production of a handwritten, hand-affixed or printed trace on a surface, the computer program product comprising a support and stored on this support instructions that can be read by a processor, these instructions being configured, when executed, for:

extracting several features describing the trace from at least one three-dimensional image of said trace, acquired by an imagery system, and inputting said extracted features in a trained module to output said at least one information, said module having been trained beforehand with a plurality of previously-acquired three-dimensional images of traces and corresponding information related to the production of these traces.

The features defined above for the methods and the system apply to the computer program product.

DESCRIPTION OF THE DRAWING

The invention may be better understood from reading the following detailed description of non-limiting implementation examples thereof, and with reference to the attached drawing, in which.

DETAILED DESCRIPTION

Figure 1:
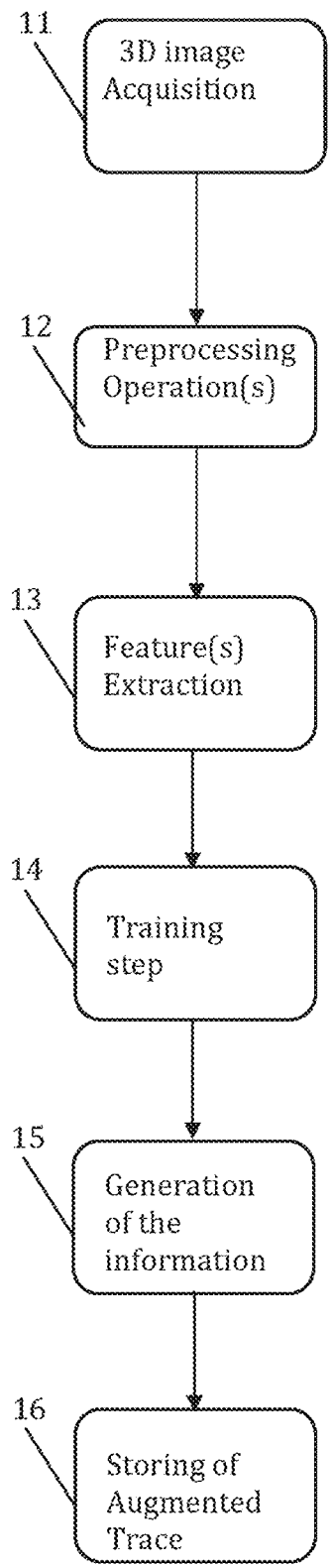
FIG. 1 is a block diagram showing some exemplary steps of the method for analyzing a handwritten or printed trace according to the invention.

An example of detailed steps of the method for generating at least one information about the production of traces handwritten, hand-affixed or printed on a surface according to the invention will be described with reference to FIG. 1.

In this example, in a step 11, a three-dimensional image of a handwritten trace is acquired by an imagery system that allows recovering a 3D image at least one or different resolutions. The 3D imagery system is for example a 3D scanner, a 3D laser scanning microscope, a 3D optical sensor based on Optical Coherence Tomography, a chromatic white-light sensor, a confocal laser scanning microscope, a scanning electron microscope, a 3D laser profilometer, or a sensor based on conoscopic holography.

In a step 12, at least one preprocessing operation is performed on said three-dimensional image. Several features describing the trace are then extracted from said at least one three-dimensional image, in a step 13.

In this example, and preferably, the method according to the invention is performed by an electronic system comprising a preprocessing module, configured to perform said preprocessing operations.

In a step 14, a trained module, trained beforehand with a plurality of previously-acquired three-dimensional images of traces and corresponding information related to the production of these traces, is trained with said extracted features describing the trace, in order to, in a step 15, generate at least one information about the production of the trace. At least a weighted combination of said extracted features describing the trace is preferably inputted in the trained module, each feature being weighted by a weight computed based at least on the type of trace, especially a trace handwritten on paper, an indented mark or a printed trace.

Preferably and in this example, at least two different resolutions of said at least one three-dimensional image are used to extract features describing the trace, said features being then combined to generate said at least one information.

In this example, in a further step 16, the three-dimensional image of the trace is stored along with said extracted feature(s), in a database, to create an augmented trace.

Figure 2:
FIG. 2 is an example of a 3D image of a signature produced with a ballpoint pen on plain white paper.

FIG. 2 is an example of a 3D image of a signature produced with a ballpoint pen on plain white paper. Such a trace presents a great depth, more irregular reliefs and the appearance of valleys, while a printed trace, for example with a laser printer, usually shows a normalization of the trace, regularity in the reliefs, more peaks, less valleys, and a lesser depth. In this case, topographic and textural features may be exploited as highly weighted features.

This signature was written on a sheet of paper and then captured with a 3D imagery system. One can notice that the high spatial resolution of the imagery system allows describing the trace finely, especially showing that the signature is in relief relatively to the used support, and also showing the presence of irregularities and bumps in the layout, a horizontal deformation of the paper support, consequence of its manipulation.

Figure 3:
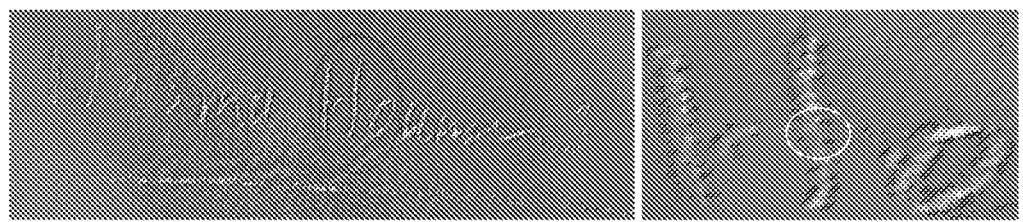
FIGS. 3(a) and 3(b) show enlargements on part of the trace of FIG. 2.

FIG. 3 shows an enlargement on a part of the signature of FIG. 2, when one can observe the superposition of two "strokes", which corresponds to segments between two pen lifts while writing. This allows determining the sequence of production of the trace.

The actual sequence of strokes "1-2-3-4", performed during the production of the "HO" trace, is visible in FIG. 2(b). One can easily observe for the letter "H" that the horizontal stroke, numbered 3, is above the second vertical stroke, numbered 2, of the letter "H". Also, one can observe that the letter "O" is above the horizontal stroke of the letter "H". In addition, it can be observed the appearance of patterns in a series of valleys and peaks, which characterizes the third dimension of the trace, making it possible to visualize the pressure produced by the hand via the pen on the paper. Thanks to the previously-described steps of the invention, the kinematic information of the trace can be retrieved, mostly the speed and acceleration of the writing, the strokes order, the pressure and the tremors applied on the surface.

Figure 4:
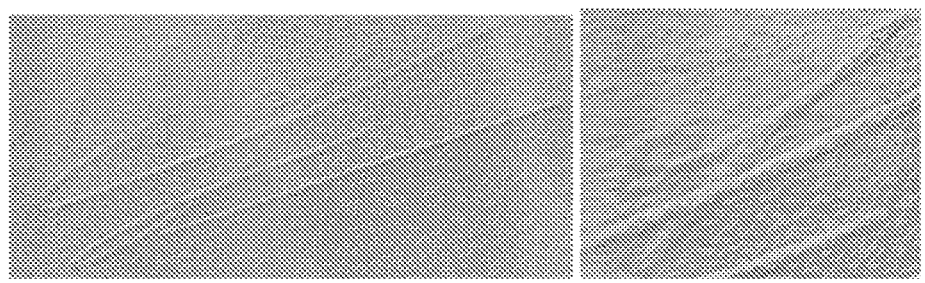
FIG. 4 is an example of a 3D image of an indented mark of a signature on a plain white paper.

FIG. 4(a) illustrates the case of an indented mark of a signature on a plain white paper. One can observe that this signature is "encrusted" exclusively in the form of hollows in the paper, unlike the signature shown in FIG. 2. The invention makes it possible to distinguish an indented trace of a trace affixed on a paper. Moreover, even in the case of an indented signature, the strokes order can be visualized with the naked eye, as visible in FIG. 3(b), and retrieved by the analysis method of the invention. The method may include multi-resolution frequency analysis of image texture, as for example Wavelet coefficient extraction. As previously explained, the analysis of the trace can give a score in the form of a numerical value: in this example, said value, comprised between 0 and 10, evaluates the authenticity of the trace, while the identity of the writer is pretended beforehand, the higher is the value, the higher is the chance of having an authentic trace.

In another example, the score may be a percentage, comprised between 0 and 100%, evaluating the probability for a trace to be a printed one. Indeed, a counterfeiter can now scan a handwritten signature at very high resolution and insert it into a document, which is then printed with a printer of very good quality, and present this document as authentic. Thanks to the invention, even without having a reference signature, it is possible to assert if a signature is printed or handwritten, and so to assert the authenticity of a document.

Also, thanks to the invention, it is possible to detect erasures not visible to human eyes by following the same analysis above-mentioned on indented marks.

The invention is not limited to the examples that have just been described.

Any other types of features, of information about the production of the trace, of combination methods and of learning and training models may be used.

The invention claimed is:

1. A method for generating at least one information about the production of a handwritten, hand-affixed or printed trace on a surface, comprising:
    extracting several features describing the trace from at least one three-dimensional image of said trace, acquired by an imagery system, and
    inputting said extracted features in a trained module to output said at least one information, said module having been trained beforehand with a plurality of previously-acquired three-dimensional images of traces and corresponding information related to the production of these traces;
wherein said information about the production of the trace is:
    the authenticity of the trace;
    whether the trace is handwritten or not;
    if the trace was made by one or more writers, and possibly the number of writers;
    the identity of the writer(s) and its verification, in the case where a list of possible identities is provided by a forensic expert, with an associated confidence score;
    the possibility that two or more traces were produced in the same way, for example by the same person, information used in the re-identification of people, or by the same ink;
    the detection of signature imitations or disguised signatures, or of autographs with 'forged' signatures;
    the type of forgery;
    the age category of the writer(s) having produced the trace, if the latter is handwritten;
    the laterality of the producer of the trace, and its inference;
    the detection of erasures not visible to human eyes;
    the identification of fingerprints on a document;
    the object or material used for the production of the trace, such as laser printer or ballpoint pen;
    the identification of the printing process used to prepare documents, such as typewriter, printed with ink jet, laser printers, and photocopiers;
    the identification of writing that has been added with a different ink;
    the nature of the surface, especially rigid or flexible;
    the production of evidence of the continuity or non-continuity of entries made in a document, such as a journal or a patient medical record; or
    the psychological state of the writer, useful for example in some applications where the profiling of a person's mental health is required.

2. The method of claim 1, wherein said extracted features are chosen amongst the following: the order of strokes, the number of strokes, the relief of the trace, the pressure exerted along the trace, the order of letter writing, the letter spacing, grey-levels of voxels, the position of pixels forming the trace, the width of the trace, or gradient-based features, slope-based features, features based on internal and external contours, topographic features based on texture analysis, fractal measures.

3. The method of claim 1, wherein, in order to generate said at least one information about the production of the trace, at least a weighted combination of said extracted features describing the trace is inputted in the trained module, each feature being weighted by a weight computed based at least on the type of trace, especially a trace handwritten on paper, an indented mark or a printed trace.

4. The method of claim 3, wherein, in the case of an indented mark, features describing the relief of the trace or the pressure exerted along the trace are weighted by higher weights than features describing the order and the number of strokes, the letter spacing, and grey-levels of voxels.

5. The method of claim 3, wherein the combinations of features and/or information about the surface or contained in it are performed by methods chosen amongst: weighted sum, model-based merging methods, clustering ensembles, Dempster-Shafer method, particle swarm optimization, or Gaussian mixture models.

6. The method of the preceding claim, wherein, in the case of a trace handwritten on paper, features describing the order and the number of strokes, the letter spacing, and grey-levels of voxels, are weighted by higher weights than features describing the relief of the trace or the pressure exerted along the trace.

7. The method of claim 1, wherein information about the surface or contained in it is combined with said extracted feature describing the trace to generate said at least one information.

8. The method of claim 1, wherein at least two different resolutions of said at least one three-dimensional image are used to extract features describing the trace, said features being then combined to generate said at least one information.

9. The method of claim 1, wherein said features are extracted thanks to operations chosen amongst the following: segmentation, edge detection, morphological operations, such as erosion, dilatation, closing or opening, frequency analysis, such as Fourier transform, wavelet transform, Gabor filters.

10. The method of claim 1, wherein the trained module comprises one or several neural networks, and/or one or several decision trees, and/or one or different classifiers.

11. The method of claim 1, wherein the trained module has also been trained beforehand to learn features describing traces and extracted from said plurality of previously-acquired three-dimensional images of traces.

12. The method of claim 1, wherein at least one preprocessing operation is performed on said images, as a smoothing, enhancing, or filtering.

13. The method of claim 1, wherein the three-dimensional images of the traces are acquired by a 3D scanner, a 3D laser scanning microscope, a 3D optical sensor based on Optical Coherence Tomography, a chromatic white-light sensor, a confocal laser scanning microscope, a scanning electron microscope, a 3D laser profilometer, or a sensor based on conoscopic holography.

14. The method of claim 1, wherein the three-dimensional image of the trace is stored along with said extracted features to create an augmented trace, being preferably further stored in a database.

15. A method for identifying and/or authenticating a trace handwritten on a surface, comprising:
- extracting several features describing the trace from at least one three-dimensional image of said trace, acquired by an imagery system, and
- inputting said extracted features in a trained module to output at least one information about the identification and/or the authentication of said trace, said module having been trained beforehand with a plurality of previously-acquired three-dimensional images of traces and corresponding information related to the identification and/or the authentication of these traces;

wherein said information about the production of the trace is:
- the authenticity of the trace;
- whether the trace is handwritten or not;
- if the trace was made by one or more writers, and possibly the number of writers;
- the identity of the writer(s) and its verification, in the case where a list of possible identities is provided by a forensic expert, with an associated confidence score;
- the possibility that two or more traces were produced in the same way, for example by the same person, information used in the re-identification of people, or by the same ink;
- the detection of signature imitations or disguised signatures, or of autographs with 'forged' signatures;
- the type of forgery;
- the age category of the writer(s) having produced the trace, if the latter is handwritten;
- the laterality of the producer of the trace, and its inference;
- the detection of erasures not visible to human eyes;
- the identification of fingerprints on a document;
- the object or material used for the production of the trace, such as laser printer or ballpoint pen;
- the identification of the printing process used to prepare documents, such as typewriter, printed with ink jet, laser printers, and photocopiers;
- the identification of writing that has been added with a different ink;
- the nature of the surface, especially rigid or flexible;
- the production of evidence of the continuity or non-continuity of entries made in a document, such as a journal or a patient medical record; or
- the psychological state of the writer, useful for example in some applications where the profiling of a person's mental health is required.

16. The system of claim 15, wherein the trained module comprises one or several neural networks, and/or one or several decision trees, and/or one or different classifiers, especially support vector machines.

17. The system of claim 15, comprising the imagery system used for acquiring said at least one three-dimensional image of the trace.

18. The system of claim 15, comprising a user interface.

19. Computer program product for generating at least one information about the production of a handwritten, hand-affixed or printed trace on a surface, the computer program product comprising a support and stored on this support instructions that can be read by a processor, these instructions being configured, when executed, for:
- extracting several features describing the trace from at least one three-dimensional image of said trace, acquired by an imagery system, and
- inputting said extracted features in a trained module to output said at least one information, said module having been trained beforehand with a plurality of previously-acquired three-dimensional images of traces and corresponding information related to the production of these traces;

wherein said information about the production of the trace is:
- the authenticity of the trace;
- whether the trace is handwritten or not;
- if the trace was made by one or more writers, and possibly the number of writers;
- the identity of the writer(s) and its verification, in the case where a list of possible identities is provided by a forensic expert, with an associated confidence score;
- the possibility that two or more traces were produced in the same way, for example by the same person, information used in the re-identification of people, or by the same ink;
- the detection of signature imitations or disguised signatures, or of autographs with 'forged' signatures;
- the type of forgery;
- the age category of the writer(s) having produced the trace, if the latter is handwritten;
- the laterality of the producer of the trace, and its inference;
- the detection of erasures not visible to human eyes;
- the identification of fingerprints on a document;
- the object or material used for the production of the trace, such as laser printer or ballpoint pen;
- the identification of the printing process used to prepare documents, such as typewriter, printed with ink jet, laser printers, and photocopiers;
- the identification of writing that has been added with a different ink;
- the nature of the surface, especially rigid or flexible;
- the production of evidence of the continuity or non-continuity of entries made in a document, such as a journal or a patient medical record; or
- the psychological state of the writer, useful for example in some applications where the profiling of a person's mental health is required.

20. System for generating at least one information about the production of a handwritten, hand-affixed or printed trace on a surface, comprising a trained module, the system being configured to:
- extract several features describing the trace from at least one three-dimensional image of said trace, acquired by an imagery system, and
- input said extracted features in the trained module to output said at least one information, said module having been trained beforehand with a plurality of previously-acquired three-dimensional images of traces and corresponding information related to the production of these traces;

wherein said information about the production of the trace is:
- the authenticity of the trace;
- whether the trace is handwritten or not;
- if the trace was made by one or more writers, and possibly the number of writers;
- the identity of the writer(s) and its verification, in the case where a list of possible identities is provided by a forensic expert, with an associated confidence score;

the possibility that two or more traces were produced in the same way, for example by the same person, information used in the re-identification of people, or by the same ink;

the detection of signature imitations or disguised signatures, or of autographs with 'forged' signatures;

the type of forgery;

the age category of the writer(s) having produced the trace, if the latter is handwritten;

the laterality of the producer of the trace, and its inference;

the detection of erasures not visible to human eyes;

the identification of fingerprints on a document;

the object or material used for the production of the trace, such as laser printer or ballpoint pen;

the identification of the printing process used to prepare documents, such as typewriter, printed with ink jet, laser printers, and photocopiers;

the identification of writing that has been added with a different ink;

the nature of the surface, especially rigid or flexible;

the production of evidence of the continuity or non-continuity of entries made in a document, such as a journal or a patient medical record; or the psychological state of the writer, useful for example in some applications where the profiling of a person's mental health is required.

* * * * *